United States Patent
Keller et al.

(10) Patent No.: US 6,454,506 B1
(45) Date of Patent: Sep. 24, 2002

(54) ANCHOR BOLT WITH AN OUTER THREAD HAVING THREAD TURNS WITH DIFFERENT CROSS-SECTIONAL SHAPE

(75) Inventors: Kai-Uwe Keller, Feldkirch-Tisis (AT); Marcel John, Sevelen (CH); Jürgen Wieser, Kaufering (DE)

(73) Assignee: Hilti Aktiengesellschaft, Schaan (DE)

( * ) Notice: Subject to any disclaimer, the term of this patent is extended or adjusted under 35 U.S.C. 154(b) by 0 days.

(21) Appl. No.: 09/635,283

(22) Filed: Aug. 9, 2000

(30) Foreign Application Priority Data

Aug. 13, 1999 (DE) .......................... 199 38 363

(51) Int. Cl.⁷ .............................. F16B 25/10
(52) U.S. Cl. ............. 411/387.4; 411/423; 411/415
(58) Field of Search .................. 411/411, 414, 411/415, 423, 387.4, 386–387.3

(56) References Cited

U.S. PATENT DOCUMENTS

| | | | | |
|---|---|---|---|---|
| 2,278,377 A | * | 3/1942 | Cook | |
| 2,356,098 A | * | 8/1944 | Steinle | |
| 3,351,115 A | * | 11/1967 | Boehlow | |
| 3,799,229 A | * | 3/1974 | Johnson | |
| 5,188,496 A | * | 2/1993 | Giannuzzi | |
| 5,730,744 A | * | 3/1998 | Justin | |
| 5,964,768 A | * | 10/1999 | Huebner | |

* cited by examiner

*Primary Examiner*—Flemming Saether
(74) *Attorney, Agent, or Firm*—Sidley Austin Brown & Wood, LLP

(57) ABSTRACT

An anchor bolt having a substantially cylindrical stem (2), and at least one thread provided on the stem (2) and extending from a free front end of the stem at least over a portion of a longitudinal extent of the stem (2), the thread (6) having a plurality of thread turns (6) having, at least over one/third of the stem (2), a width ($b_1$, $b_2$) which decreases, with an increase of a distance of a respective thread turn (6) from the free front end of the stem (2), so that a distance ($x_1$, $x_2$, $x_3$) between trailing and leading flanks (8, 7) of two following one another thread turns (6) of the thread increases backwards.

8 Claims, 1 Drawing Sheet

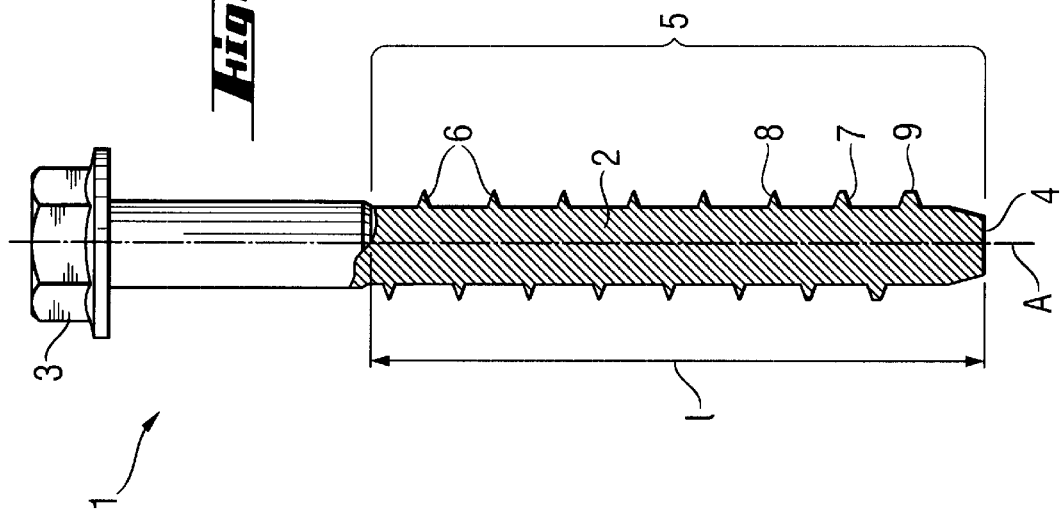
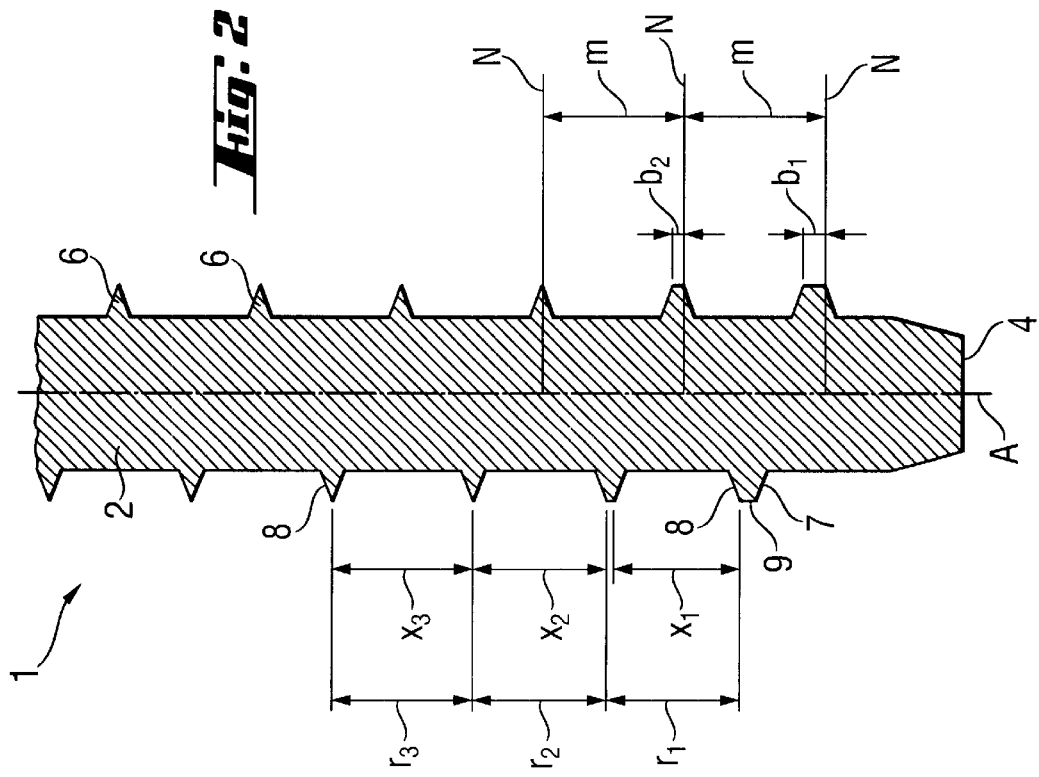

ANCHOR BOLT WITH AN OUTER THREAD HAVING THREAD TURNS WITH DIFFERENT CROSS-SECTIONAL SHAPE

BACKGROUND OF THE INVENTION

1. Field of the Invention

The present invention relates to an anchor bolt having a substantially cylindrical stem and at least one thread formed, preferably, as one-piece with the stem and extending from the front free end of the stem over at least a portion of the longitudinal extent of the stem.

2. Description of the Prior Art

For attachment of constructional parts to a constructional component, in particular, to concrete or brickwork, in addition to plastic and metal dowels, also anchor bolts are used. Preferably, anchor bolts are used in through-mounting and for temporary attachment when an easy and rapid dismantling capability is needed. The anchor bolts are formlockingly anchored because, during the setting process, they form a thread in the wall of the preliminary formed bore. To this end, the anchor bolt stem is provided with a thread which, upon rotation of the anchor bolt, cuts and mills the wall surface. The properties of known anchor bolts, in particular, of anchor bolts used for attachment of constructional parts to a concrete, are defined by the diameter of the bore in which the anchor bolt to be anchored, i.e., by the diameter of the anchor bolt system, by flank height of the thread, its steepness, and setting depth. The obtainable holding forces depend on the setting depth, stem diameter, the quality of the constructional component, e.g., of concrete, etc.

The adjustment of attachments effected with anchor bolt is relatively easy and can be done easily and quickly. The known anchor bolt must, however, be set-in rather deeply in order to obtain the necessary holding forces. In comparison with an undercut system, they use the strength of the concrete only to a small degree. At small setting depths, the conventional anchor bolts, in particular under dynamic loads, have often unsatisfactory load resistance values. With a tensile load, there is a danger of formation, in the surface of the constructional component, of conical outbreaks which occur as result of introduction of force peaks in the surface region. As a result, the constructional component shears off, as a zipper, along the turns of the outer thread until a total breakdown of the anchor bolt attachment occurs.

Accordingly, an object of the present invention is to eliminate the drawbacks of the prior art anchor bolt and to provide an anchor bolt, in particular a threaded anchor bolt embedded in concrete, having, in comparison with the conventional anchor bolts, favorable load resistance characteristics.

Another object of the present invention is to provide an anchor bolt with which necessary load resistance values are obtained, in particular under a dynamic load even when it is set at a small depth.

SUMMARY OF THE INVENTION

These and other objects of the present invention, which will become apparent hereinafter, are a achieved by providing an anchor bolt having a substantially cylindrical stem and at least one thread formed thereon, preferably, as one-piece part, and extending from a free front end of the stem at least over a portion of the stem longitudinal extent. The thread turns have at least over a front one/third of the stem, an axial flank width which decreases, with an increase, of the distance of respective thread turns from the free front end of the stem, so that the distance between two following each other thread flanks of two following each other thread turns of the thread increases backwards, i.e., in a direction opposite to the setting direction of the anchor bolt.

The shape of the thread according to the present invention permitted to obtain with the anchor bolt load characteristics comparable with those characterizing an undercut system. As a result of the thread shape, at a tensible load acting on the anchor bolt, the load is introduced in the bore deepest region. This provides for much better use of the concrete strength. The thread turns in the surface region do not apply any shearing forces to the thread cut in the bore wall upon application of the tensible load. As a result, the formation of cone outbreaks and a zipper shearing effect are prevented.

According to an advantageous embodiment of the present invention, the trailing flanks of the thread turns are spaced from respective reference planes, which extend transverse to a stem axis and pass through transitional points from leading flanks to respective regions of the thread turns spaced radially from the stem by a largest distance, by an axial distance, by an axial distance that decreases with an increase of a distance the respective thread turns are spaced from the free front end of the stem. the thread turns, which are located in the region of the free front end of the stem, have a larger axial flank width than the following backwards thread turns. Therefore, it is the front thread turns of the anchor bolt that define the width of the thread formed in the concrete. Therefore, the frontmost thread turns are almost completely embedded in the thread ridging formed by the frontmost thread turns of the anchor bolt in concrete. The axial width of the following thread turns decreases so that the leadings flanks still abut the limiting surfaces, adjacent to the bore deepest region, of the thread ridging of the thread formed in the bore wall. The following thread turn flanks, with an increases of their distance from the free front end of the stem, become spaced from the limiting surfaces of the cut thread ridging by ever increasing distances. As a result, it is insured that upon application of a tensile load, no shear stresses are generated in the surface region of the concrete.

The reduction of material on the thread can be achieved by forming the thread so that the trailing thread flanks form with a reference plane, which extends transverse to the thread turn, an angle which decreases in the backward direction. For manufacturing reasons, it is, however, preferred when the trailing flanks of two adjacent threads turns extend parallel to each other or substantially parallel.

In order to insure the introduction of load forces into the deepest region of the bore, even under unfavorable conditions, e.g., at a partial breakdown of the concrete, the thread has a pitch measured between the trailing flanks of two adjacent thread turns and which decreases with an increase of the distance from the free front-end of the stem. The pitch decreases linearly from the free front end of the stem backwards and passes into a thread region with a constant pitch. The thread region with a constant pitch occupy from about one/third to about three/fourth of the total thread length.

The thread has a length that occupies from about one/third to about three/fourth of the longitudinal extent of the stem. These constructive measures permit to reliably prevent shears stresses in the surface region of the constructional component.

The shape of the thread is so selected according to the present invention that the pitch measured at the trailing flank changes. However, the mean thread pitch, which is measured at references planes, extending transverse to the stem axis and passing through thread turns, remains constant.

In accordance with an advantageous embodiment of the present invention, the thread can have, in the front region of the stem, two-three thread turns having a larger mean pitch than in the remaining section of the thread. This insures a smaller deformation in the constructional component at the formlocking anchoring of the anchor bolt and an increased restoring torque. This reduces the danger of automatic loosening of the anchor bolt.

The novel features of the present invention, which are considered as characteristic for the invention, are set forth in the appended claims. The invention itself, however, both as to its construction and its mode of operation, together with additional advantages and objects thereof, will be best understood from the following reference to the accompanying drawings.

BRIEF DESCRIPTION OF THE DRAWINGS

The drawings show:

FIG. 1 a partially cross-sectional side view of an anchor bolt according to the present invention;

FIG. 2 a cross-sectional view of the front section of the stem of the anchor bolt shown in FIG. 1 at an increased scale.

DETAILED DESCRIPTION OF THE PREFERRED EMBODIMENTS

An anchor bolt according to the present invention, which is shown in FIGS. 1–2, is generally designated with a reference numeral 1. The anchor bolt 1, in particular a anchor bolt, embedded in concrete includes a cylindrical stem 2 and a head 3 having, e.g., a hexagonal cross-section. Advantageously, at least the anchor bolt stem 2 is formed of a hardened stainless steel. The stem axis is designated with a reference character A. The stem 2 has an anchoring region 5 which extends from the free front end 4, which is opposite the bolt head 3, over from about ⅓ to about ¾ of the entire length of the stem 2. The anchoring region 5 is provided with a thread which, preferably, is formed as one-piece with the stem 2 and the thread turns 6 of which extend helically along the anchoring region 5. In a modified embodiment, the anchoring region can have two or more threads. Each thread turn 6 has, adjacent to the free front end 4 of the anchor bolt 1, a leading flank 7 and adjacent to the bolt head 3 a trailing flank 8. The axial flank region, which is located between the leading flank 8 and the trailing flank 9, is designated with a reference numeral 9.

The anchor bolt 1, a leading flank 7 and adjacent to the bolt head 3 a trailing flank 8. The axial flank region, which is located between the leading flank 7 and the trailing flank 8, is designated with a reference numeral 9. The decrease of the flank region widths $b_1$, $b_2$ is so selected that the distance $x_1$, $x_2$, $x_3$ between the trailing flank 8 and the leading flank 7 of the two following each other thread turns 6 of the same thread increases backwards, i.e., toward the bolt head 3. This is achieved by a reduction of the thickness of material of the thread turns 6 in the region of the trailing flanks 8. At that, the trailing flanks 8 are axially spaced from respective planes N, which extend perpendicular to the stem axis A, due to transition from the leading flank 7 to the region 9, which is radially spaced from the stem 2 by a largest distance, by an axial distance $b_1$, $b_2$ which decreases with the increase of the distance of the respective trailing flank 8 from the free end 4 of the shaft 2. Preferably, a projection of following each other trailing flanks 8 produces parallel courses. The thread pitch $r_1$, $r_2$, $r_3$, which is measured at the trailing flanks 8, decreases in a backward direction toward the bolt head 3, while the medium pitch m of the thread which is defined by the reference planes N, preferably, remains substantially constant along the anchoring region 5. The thread pitch $r_1$, $r_2$, $r_3$ is reduced from the front end 4 of the stem 2 in the direction toward the bolt head 3 preferably linearly. A section of the thread, which has a constant thread pitch, adjoins the section with the gradually reduced pitch and has a length, in the embodiment shown in the drawings, of about half of the total thread length 1. In other embodiments, the length of the constant pitch section can amount from about ⅓ to about ¾ of the total length 1 of the thread. In an advantageous embodiment of the present invention, the thread has, in the region of the frontmost two-three thread turns, a larger medium pitch m then in the remaining portion of the thread.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An anchor bolt to be set in a constructional component, comprising a head (3); a substantially cylindrical stem (2) extending from the head and having a front free end (4) remote from the head (3); and at least one thread provided on the stem (2) and extending from the free front end (4) of the stem at least over a portion of a longitudinal extent of the stem (2), the thread (6) having a plurality of thread turn (6) having, at least over a front one/third of the stem (2) measured from the free front end (4), an axial width ($b_1$, $b_2$), which decreases, with an increase of a distance of a respective thread turn (6) from the free front end (4) of the stem (2), so that a distance ($x_1$, $x_2$, $x_3$) between trailing and leading flanks (8, 7) of following one another, in a setting direction of the anchor bolt, thread turns (6) increases in a direction opposite to the setting direction of the anchor bolt, wherein the thread has, over an entire length thereof, a constant medium pitch measured between adjacent reference plans (N) that extend transverse to stem axis (A) and pas through respective transitional points from leading flanks (7) of respective adjacent thread turns to regions of the respective adjacent thread turns spaced radially from the stem (2) by a largest distance.

2. An anchor bolt to be set in a constructional component, comprising a head (3); a substantially cylindrical stem (2) extending from the head and having a front free end (4) remote from the head (3); and at least on thread provided on the stem (2) and extending from the free front end (4) of the stem at least over a portion of a longitudinal extent of the stem (2), the thread (6) having a plurality of thread turn (6) having, at least over a front one/third of the stem (2) measured from the free front end (4), an axial width ($b_1$, $b_2$), which decreases, with an increase of a distance of a respective thread turn (6) from the free front end (4) of the stem (2), so that a distance ($x_1$, $x_2$, $x_3$) between trailing and leading flanks (8, 7) of following one another, in a setting direction of the anchor bolt, thread turns (6) increases in a direction opposite to the setting direction of the anchor bolt.

3. An anchor bolt according to claim 2, wherein the trailing flanks (8) of two adjacent thread turns (6) of the at least one thread extend substantially parallel to each other.

4. An anchor bolt according to claim 2, wherein thread pitches ($r_1$, $r_2$, $r_3$) which are measured between the trailing flanks (8) of two adjacent thread turns (6), decrease with an increase of a distance from the front end of the stem (2) at least in the front one/third of the stem (2).

5. An anchor bolt according to claim 4, wherein the thread has a region with a constant pitch which extends from the front one/third of the stem (2) to about three/fourths of the stem (2) measured from the free front end (4) of the stem.

6. An anchor bolt according to claim 2, wherein the thread has, in a region of a front two-third of the stem (2), a larger mean pitch than in a remaining region.

7. An anchor rod according to claim 2, wherein at least the stem is formed of hardened stainless steel.

8. An anchor rod according to claim 2, wherein the thread and the bolt are formed as a one-piece member.

* * * * *